United States Patent
Yuan et al.

(10) Patent No.: US 11,971,916 B2
(45) Date of Patent: Apr. 30, 2024

(54) CONVERSION OF TABULAR FORMAT DATA TO MACHINE READABLE TEXT FOR QA OPERATIONS

(71) Applicant: INTERNATIONAL BUSINESS MACHINES CORPORATION, Armonk, NY (US)

(72) Inventors: Zhong Fang Yuan, Xi'an (CN); Tong Liu, Xi'an (CN); Li Juan Gao, Xi'an (CN); Si Heng Sun, Xi'an (CN); Na Liu, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 17/537,579

(22) Filed: Nov. 30, 2021

(65) Prior Publication Data
US 2023/0169101 A1   Jun. 1, 2023

(51) Int. Cl.
*G06F 16/33* (2019.01)
*G06F 16/332* (2019.01)
(Continued)

(52) U.S. Cl.
CPC ...... *G06F 16/3344* (2019.01); *G06F 16/3329* (2019.01); *G06F 16/338* (2019.01); *G06F 40/205* (2020.01); *G06F 40/30* (2020.01); *G06F 40/56* (2020.01); *G06N 3/045* (2023.01); *G06T 7/70* (2017.01); *G06V 10/82* (2022.01); *G06V 30/18181* (2022.01); *G06V 30/191* (2022.01); *G06V 30/413* (2022.01); *G06V 30/414* (2022.01); *G06T 2207/20072* (2013.01); *G06T 2207/20081* (2013.01); *G06T 2207/20084* (2013.01)

(58) Field of Classification Search
CPC .................................................. G06F 16/3344
See application file for complete search history.

(56) References Cited

U.S. PATENT DOCUMENTS 9,430,558 B2    8/2016  Bhat
2013/0262501 A1  10/2013  Kuchmann-Beauger
(Continued)

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Van H Oberly
(74) *Attorney, Agent, or Firm* — Schmeiser, Olsen & Watts, LLP; Edward Wixted

(57) ABSTRACT

A system and method for table conversion including converting a table containing text in tabular form to an image, labeling each text area of the image with a bounding box, determining for each bounding box, a position information, a semantic information, and an image information, reconstructing the image into a graph form having a plurality of nodes, wherein each node represents the bounding box of the text areas of the image, inputting at least two nodes into a trained neural network to determine a relative relationship between the at least two nodes, building a knowledge graph using the relative relationship of the at least two nodes, and translating the knowledge graph into machine readable natural language.

20 Claims, 11 Drawing Sheets

(51) Int. Cl.
*G06F 16/338* (2019.01)
*G06F 40/205* (2020.01)
*G06F 40/30* (2020.01)
*G06F 40/56* (2020.01)
*G06N 3/045* (2023.01)
*G06T 7/70* (2017.01)
*G06V 10/82* (2022.01)
*G06V 30/18* (2022.01)
*G06V 30/19* (2022.01)
*G06V 30/413* (2022.01)
*G06V 30/414* (2022.01)

(56) References Cited

U.S. PATENT DOCUMENTS

2014/0072947 A1   3/2014   Boguraev
2015/0309990 A1   10/2015  Allen
2019/0303498 A1*  10/2019  Saha .................... G06F 16/367
2020/0167420 A1   5/2020   Yin
2020/0410231 A1*  12/2020  Chua .................. G06F 18/2413

OTHER PUBLICATIONS

Authors et. al.: Disclosed Anonymously, An Unsupervised Neuro-Symbolic Approach for Cell Retrieval and QA Over Tables, IP.com No. IPCOM000265080D, IP.com Electronic Publication Date: Feb. 23, 2021, https://priorart.ip.com/IPCOM/000265080, 5 pages.

Authors et. al.: Disclosed Anonymously, Automated Knowledge Graph Population from Open-Ended Tables, IP.com No. IPCOM000265694D, IP.com Electronic Publication Date: May 6, 2021, https://priorart.ip.com/IPCOM/000265694, 6 pages.

Jain et al., Extracting Tabular data for question-Answering from Documents, Cods Comad 2021, Jan. 2-4, 2021, Bangalore, India, Conference Paper . Jan. 2021, https://dl.acm.org/doi/abs/10.1145/3430984.3430992, 6 pages.

Talmor et al., MultimodalQA: Complex Question Answering Over Text, Tables and Images, Published as a conference paper at ICLR 2021, https://openreview.net/pdf?id=ee6W5UgQLa, 12 pages.

* cited by examiner

111

Table 1

|  | Column A | Column B | Column C | Column D | Column E | Column F |
|---|---|---|---|---|---|---|
| Row Name 1 | A1 | B1 | C1 | D1 | E1 | F1 |
| Row Name 2 | A2 | B2 | C2 | D2 | E2 | F2 |
| Row Name 3 | A3 | B3 | C3 | D3 | E3 | F3 |
| Row Name 4 | A4 | B4 | C4 | D4 | E4 | F4 |

116  117                Table 1

117

|  | [Column A] | [Column B] | [Column C] | [Column D] | [Column E] | [Column F] |
|---|---|---|---|---|---|---|
| [Row Name 1] | [A1] | [B1] | [C1] | [D1] | [E1] | [F1] |
| [Row Name 2] | [A2] | [B2] | [C2] | [D2] | [E2] | [F2] |
| [Row Name 3] | [A3] | [B3] | [C3] | [D3] | [E3] | [F3] |
| [Row Name 4] | [A4] | [B4] | [C4] | [D4] | [E4] | [F4] |

CONVERSION OF TABULAR FORMAT DATA TO MACHINE READABLE TEXT FOR QA OPERATIONS

BACKGROUND

In document questions-answer (QA) scenarios, it is difficult to efficiently extract the information contained in a tabular format.

SUMMARY

An embodiment of the present invention relates to a method, and associated computer system and computer program product for table conversion. A processor of a computing system converts a table containing text in tabular form to an image. Each text area of the image is labeled with a bounding box. For each bounding box, a position information, a semantic information, and an image information is determined. The image is reconstructed into a graph form having a plurality of nodes, wherein each node represents the bounding box of the text areas of the image. At least two nodes are input into a trained neural network to determine a relative relationship between the at least two nodes. A knowledge graph is built using the relative relationship of the at least two nodes. The knowledge graph is translated into machine readable natural language.

BRIEF DESCRIPTION OF THE DRAWINGS

FIG. 2 depicts an image of a table, in accordance with embodiments of the present invention.

FIG. 3 depicts the table of FIG. 2 with bounding boxes 117 around the text, in accordance with embodiments of the present invention.

DETAILED DESCRIPTION

Figure 1:
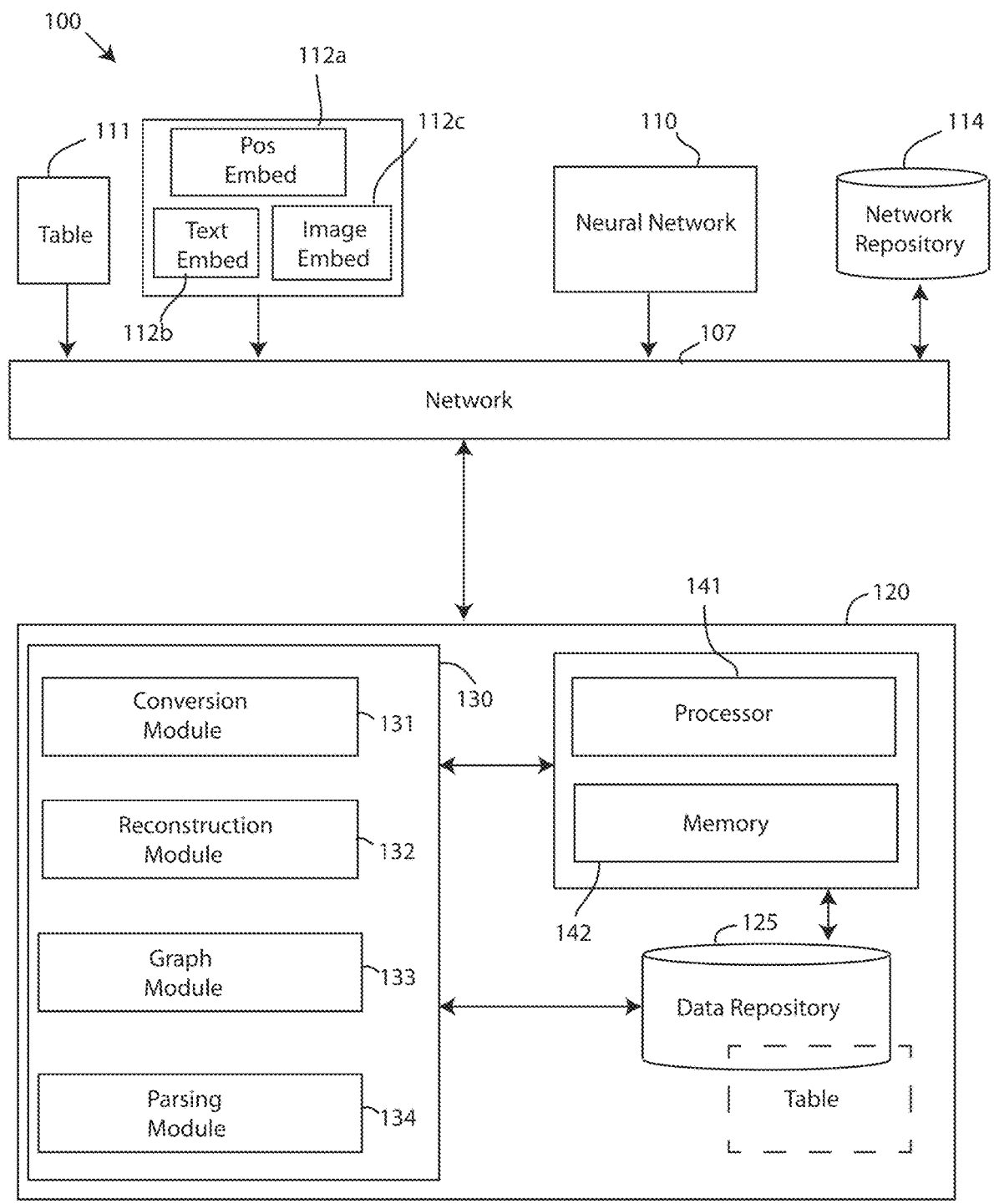
FIG. 1 depicts a block diagram of table conversion system, in accordance with embodiments of the present invention.

In document QA scenarios, how to extract information accurately and efficiently in a table is a difficult point. The reason is that compared to traditional document QA scenarios where the answer is in a main text (e.g., a paragraph in a text document), the QA in the table often needs to be correlated with multiple parts of information to be accurately located; this information is often unable to be correlated based on a single NLP technology. For example, take the following query: How long does it take to test the document parsing function in the company's XXX project? This question requires three parts of information including table header, table column name, and table row name in the associated table to accurately locate the correct answer "40 hours." The traditional method must first extract the table into csv or json through a table extraction tool, and then customize the extraction method through rules. This method not only requires a lot of manual preparation of rules, but rules that are not universal are limited and may only apply in narrow application scenarios. Methods that rely on deep learning such as TTOT have disadvantages such as excessive requirements on the degree of table regularity and fewer application scenarios. Thus, there is a need for identifying useful information presented in tabular form without the drawbacks identified above.

In brief overview, embodiments of the present invention include a method to analyze a layout of a table using a joint representation of bounding box position, semantic information, and image information to convert the information on the page into a graph structure, and then based on a community similarity of the graph, the layout information is reorganized. A generated discrete graphical structure semantic data is extracted by the method of text style transfer to generate continuous sentences suitable for QA algorithms, such as machine reading comprehension. Finally, the QA algorithm plus the layout introspection method is used to generate and verify answers to queries. Thus, embodiments of the present invention can support QA scenarios of data in various tables with borders, no borders, merged cells, etc. indiscriminately.

Embodiments of the present invention use a bounding box position+semantic information+image information joint representation to perform layout association analysis on the layout of the table, and convert the information on the page into a graphic structure. The graph-based community similarity reorganizes and analyzes the layout information of the table. In this step, three models are trained, and the text information, location information, and image information in each bounding box in the table are separately coded. Each bounding box is represented by a node of the graph, and the three parts of the coding information corresponding to the bounding box are the attributes of the node. After reconstructing the text in the scanned image into graph-type data, first for each node, a classification algorithm is used to find a type of node (e.g. "content", "row name", "column name"). For each node, the link prediction method in graph theory is used to calculate a relationship between each node with the nearest nodes. The relationship between nodes is defined in advance; the relationship can be: "in the same line", "same column", "diagonal," and other relationships. These relationships describe the logical relationship between each text area of the table. A final scanned page will be processed into a knowledge graph based on the text area.

Next, a data combination with a graph structure is obtained. A natural language generation method based on the data of the graph structure is used to organize the semantic information of each node in the graph into a continuous natural language (e.g. temporary text). In an exemplary embodiment, the method of natural language style transfer is used. Under the condition that the entity information in the sentence remains unchanged, the generated language style is as consistent as possible with the language style of the machine reading comprehension training set. Accordingly, embodiments of the present invention can effectively improve an accuracy of subsequent document QA methods based on machine reading and comprehension algorithms for documents in tabular form, which are traditionally difficult to parse for information in response to a query.

FIG. 1 depicts a block diagram of a table conversion system 100, in accordance with embodiments of the present invention. The table conversion system 100 is a system for allowing a QA operation of information presented in tabular form, such as information in a spreadsheet or table. The table conversion system 100 may be useful for reconstructing information presented in tabular form so that the information is presented as continuous natural language that can be parsed by conventional natural language processing algorithms and machine reading and comprehension engines.

The table conversion system 100 includes a computing system 120. Embodiments of the computing system 120 include a computer system, a computer, a server, one or more servers, a backend computing system, and the like.

Furthermore, the table conversion system 100 includes a neural 110, such as a Siamese Network, that is communicatively coupled to the computing system 120 over a network 107. For instance, information/data, such as node information/attributes of a knowledge graph, is transmitted to and/or received from the neural network 110 over a network 107. In an exemplary embodiment, the network 107 is a cloud computing network. Further embodiments of network 107 refer to a group of two or more computer systems linked together. Network 107 includes any type of computer network known by individuals skilled in the art. Examples of network 107 include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. In one embodiment, the architecture of the network 107 is a peer-to-peer, wherein in another embodiment, the network 107 is organized as a client/server architecture. In alternative embodiment, the neural network is a part of the computing system 120. The data output by the neural network 110 is transmitted to the computing system 120 via data bus lines connected to the processor 141 of the computing system 120.

In an exemplary embodiment, the network 107 further comprises, in addition to the computing system 120, a connection to one or more network-accessible knowledge bases 114, which are network repositories containing information relating to tables, relationships of nodes, knowledge graphs, etc., network repositories or other systems connected to the network 107 that are considered nodes of the network 107. In an embodiment where the computing system 120 or network repositories allocate resources to be used by the other nodes of the network 107, the computing system 120 and network-accessible knowledge bases 114 is referred to as servers.

The network-accessible knowledge bases 114 is a data collection area on the network 107 which backs up and save all the data transmitted back and forth between the nodes of the network 107. For example, the network repository is a data center saving and cataloging the tables, relationships of nodes, knowledge graphs, and the like, to generate both historical and predictive reports regarding a particular template or key-value structure. In an exemplary embodiment, a data collection center housing the network-accessible knowledge bases 114 includes an analytic module capable of analyzing each piece of data being stored by the network-accessible knowledge bases 114. Further, the computing system 120 can be integrated with or as a part of the data collection center housing the network-accessible knowledge bases 114. In an alternative embodiment, the network-accessible knowledge bases 114 are a local repository that is connected to the computing system 120.

The computing system 120 is configured to extract information contained in an table 111. The table 111 is an electronic document that contains information presented in tabular form, such as cells of a spreadsheet. The text within the table 111 is typically contained in cells organized by row and column that is difficult for machines to parse as natural language in response to a query. The table(s) 111 can be stored in a remote database and accessible over network 107 and/or can be stored locally on the computing system 120 in a data repository 125.

The neural network 110 is a tool for determining relative relationships between individual nodes of a graph structure based on node attributes (e.g. position information, semantic information, color information, and node type). The neural network 110 can be comprised of two identical networks, such as a Siamese Network, or other convolutional neural network that provides an output to a received input. To improve text extraction of tables having various tabular layouts, the table conversion system 100 leverages the trained neural network 110 to determine similarities between nodes for building a knowledge graph representing the information contained in the table.

The computing system 120 is also coupled to node attribute models 112a, 112b, 112c. The node attribute models 112a, 112b, 112c are trained neural network models for position embedding, text embedding, and image embedding, respectively. Node attribute model 112a may be a shallow neural network for position embedding, node attribute model 112b may be a glove or BERT network for text embedding, and node attribute model 112c may be a VGG or AlexNet network for image embedding. The outputs of the node attribute models 112a, 112b, 112c are matrix structures that can have the same shape. Information/data, such as bounding box information and node attributes, is transmitted to and/or received from the node attribute models 112a, 112b, 112c over a network 107. In alternative embodiment, the node attribute models 112a, 112b, 112c are a part of the computing system 120, and the results from node attribute models 112a, 112b, 112c are transmitted to the computing system 120 via data bus lines connected to the processor 141 of the computing system 120.

Referring still to FIG. 2, the computing system 120 of the table conversion system 100 is equipped with a memory device 142 which stores various data/information/code, and a processor 141 for implementing the tasks associated with the table conversion system 100. A table conversion application 130 is loaded in the memory device 142 of the computing system 120. The table conversion application 130 extracts information from table 111 using the neural network 110. The table conversion application 130 can be an interface, an application, a program, a module, or a combination of modules. In an exemplary embodiment, the table conversion application 130 is a software application running on one or more back end servers (e.g. computing system 120).

The table conversion application 130 of the computing system 120 includes a conversion module 131, a reconstruction module 132, a graph module 133, and a parsing module 134. A "module" refers to a hardware-based module, a software-based module, or a module that is a combination of hardware and software. Hardware-based modules include self-contained components such as chipsets, specialized circuitry and one or more memory devices, while a software-based module is a part of a program code or linked to the program code containing specific programmed instructions, which is loaded in the memory device of the computing system 120. A module (whether hardware, software, or a combination thereof) is designed to implement or execute one or more particular functions or routines.

The conversion module 131 includes one or more components of hardware and/or software program code for converting a table, such as table 111 containing text in tabular form to an image. The conversion of the table 111 to an image of the table can be accomplished using table recognition methods, for example, leveraging UNET architecture. Other table recognition methods may be used. By converting the table 111 to an image, the conversion module 131 can determine the position/location of the cells (e.g. layout) of the table 111. FIG. 2 depicts an image of the table 111, in accordance with embodiments of the present invention. A table, searchable or non-searchable, is converted to an image by the conversion module 131 as described above. The table 111 includes rows "Row Name 1," "Row Name 2," "Row Name 3," and "Row Name 4," columns "Column A," "Column B," "Column C," "Column D," "Column E," and "Column F," and cell content "A1-A4," "B1-B4," "C1-C4," "D1-D4," "E1-E4," and "F1-F5."

The conversion module 131 performs an optical character recognition of the image table 111 and labels each text area of the image 111 with a bounding box. In an exemplary embodiment, the conversion module 131 performs an OCR on the entire table to locate positions of the text included in the table 111. The conversion module 131 labels or annotates the table 111 by creating a bounding box around the extracted text at the positions of the text. FIG. 3 depicts the table 111 of FIG. 2 with bounding boxes 117 around the text, in accordance with embodiments of the present invention. Bounding boxes 117 can be labeled using an annotator or similar software tool.

Once the table 111 has been labeled with the bounding boxes 117, the conversion module 131 determines, for each bounding box 117, a position information, a semantic information, and an image information. The position information refers to the coordinates of the bounding box within the image 111'. The conversion module 131 may identify the coordinates for all of the bounding boxes annotated on the file, or may target bounding boxes located in a general region of the file, such as the top half of the file, bottom half of the file, upper right, upper left, etc. to limit the scope of the extraction operation of many files. The semantic information refers to the content and/or meaning of the text within the cell 116. The image information refers to a color of the cell 116 or a color of the background area of the text within the cell 116

Figure 4:
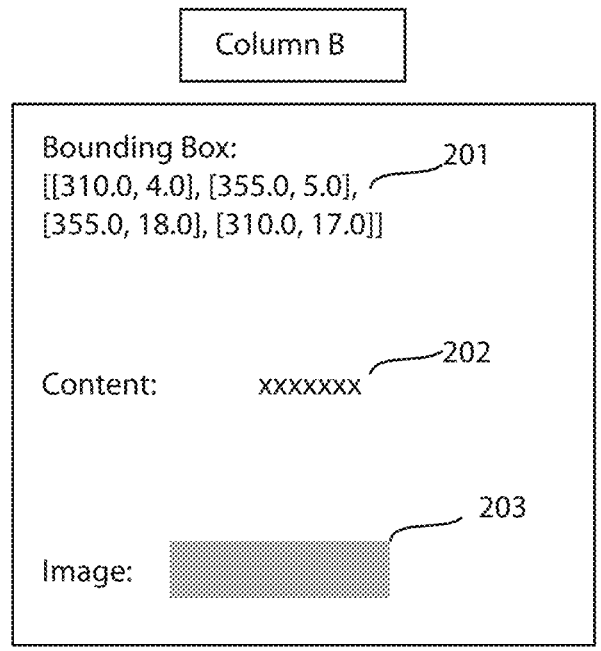
FIG. 4 depicts an example of identifying the position information, the semantic information, and the image information of a cell of the table FIG. 3, in accordance with embodiments of the present invention.

Using the key "Column B" as an example, the conversion module 131 learns the coordinates of the bounding box surrounding "Column B," the text content within the bounding box 117 surrounding "Column B," and the color of the cell 116 containing "Column B" as a function of the OCR. The conversion module 131 determines the coordinates of the four corners of the bounding box 117. FIG. 4 depicts an example of identifying the position information 201, the semantic information 202, and the image information 203 of a cell of the table 111' of FIG. 3, in accordance with embodiments of the present invention. In the illustrated embodiment, the coordinates of the bounding box associated with "Column B" is [[310.0, 4.0], [355.0, 5.0], [355.0, 18.0], [310.0, 17.0]]. Knowing the coordinates of the bounding box, the conversion module 131 determines the position information 201 of the bounding box surrounding "Column B." The semantic information 202 in the illustrated embodiment is "xxxxxxx" which is text representing a word or a combination of words having a meaning; the semantic information is know at least by the OCR function and potentially through the aid of natural language processing. The image information 203 refers to the color of the area around the text, which in the illustrated embodiment, the color is gray. The conversion module 131 may leverage a color analyzer or visual recognition engine to determine the color of the background, thereby determining the image information of the bounding box.

Figure 5:
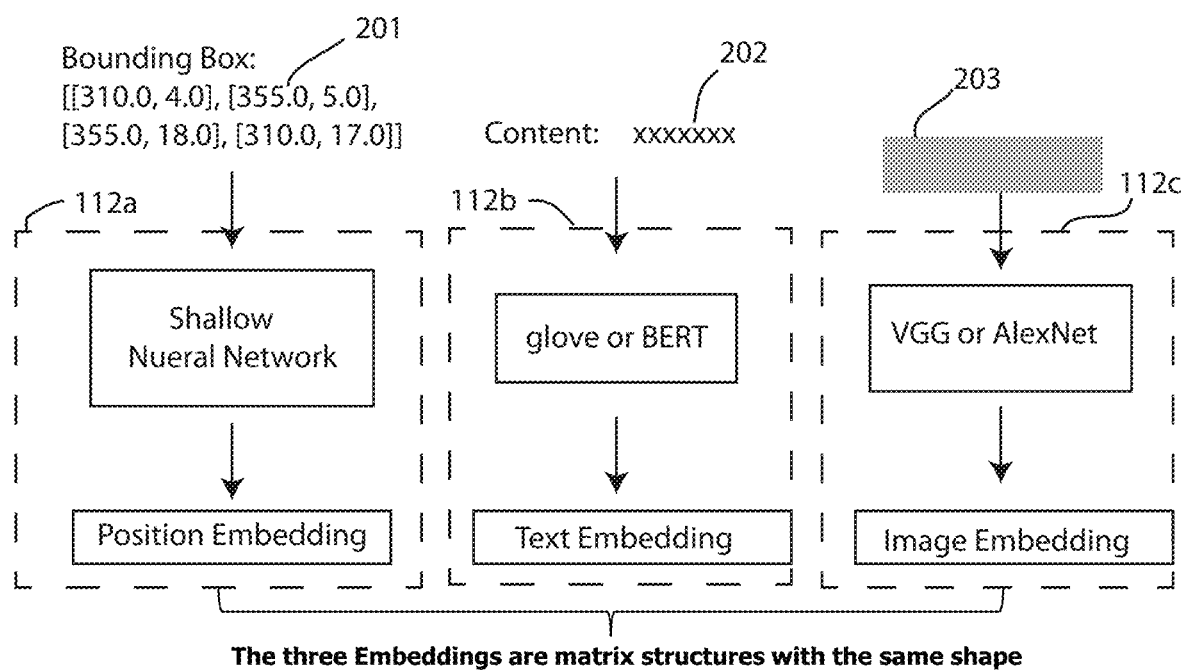
FIG. 5 depicts a block diagram of the node attribute models, in accordance with embodiments of the present invention.

Moreover, the conversion module 131 inputs the position information 201 into a first trained neural network, node attribute model 112a, for position embedding (vector), the semantic information 2021 into a second trained neural network, node attribute model 112b, for text embedding (vector), and the image information 203 into a third trained neural network, node attribute model 112c, for image embedding (vector), as shown in FIG. 5. The outputs of the node attribute models 112a, 112b, 112c are matrix structures with a same shape. Further, the position embedding, the text embedding, and the image embedding are considered to be attributes of nodes representing the bounding boxes.

Figure 6:
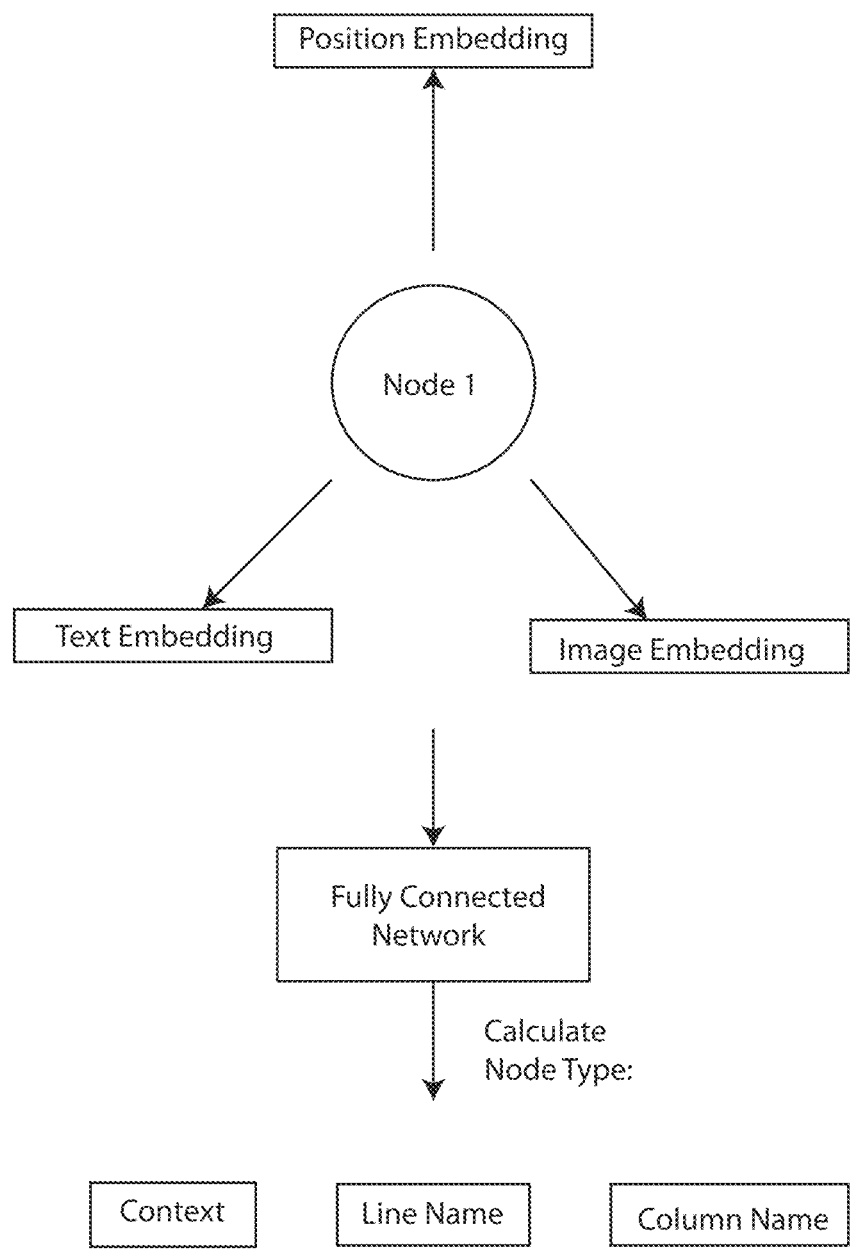
FIG. 6 depicts a block diagram for calculating node types for each node, in accordance with embodiments of the present invention.

The reconstruction module 132 includes one or more components of hardware and/or software program code for reconstructing the image into a graph form having a plurality of nodes. Each of the nodes represents the bounding box 117 of the text areas of the image 111'. For instance, the reconstruction module 132 translates the bounding boxes 117 of the image 111' into nodes that each have attributes, such as position embedding, text embedding, and image embedding. Prior to determining a relative relationship between each node to build a knowledge graph representing the table 111, the reconstruction module 132 calculate a node type for each node. FIG. 6 depicts a block diagram for calculating node types for each node, in accordance with embodiments of the present invention. In the illustrated embodiment, "Node 1" includes node attributes "Position Embedding," "Text Embedding," and "Image Embedding." "Node 1" is input into a fully connected network leveraging a classification algorithm to derive the node type of "Node 1." For instance, the reconstruction module 132 determines whether the node is content, a row name (or line name), or column name. Content, row name, and column name are essential components of a table, and thus the reconstruction module 132 determines the node type to of the nodes to understand what part of the table the node refers to. The output of the fully connected network is a node having four node attributes: position embedding, text embedding, image embedding, and node type, in graph form.

Figure 7:
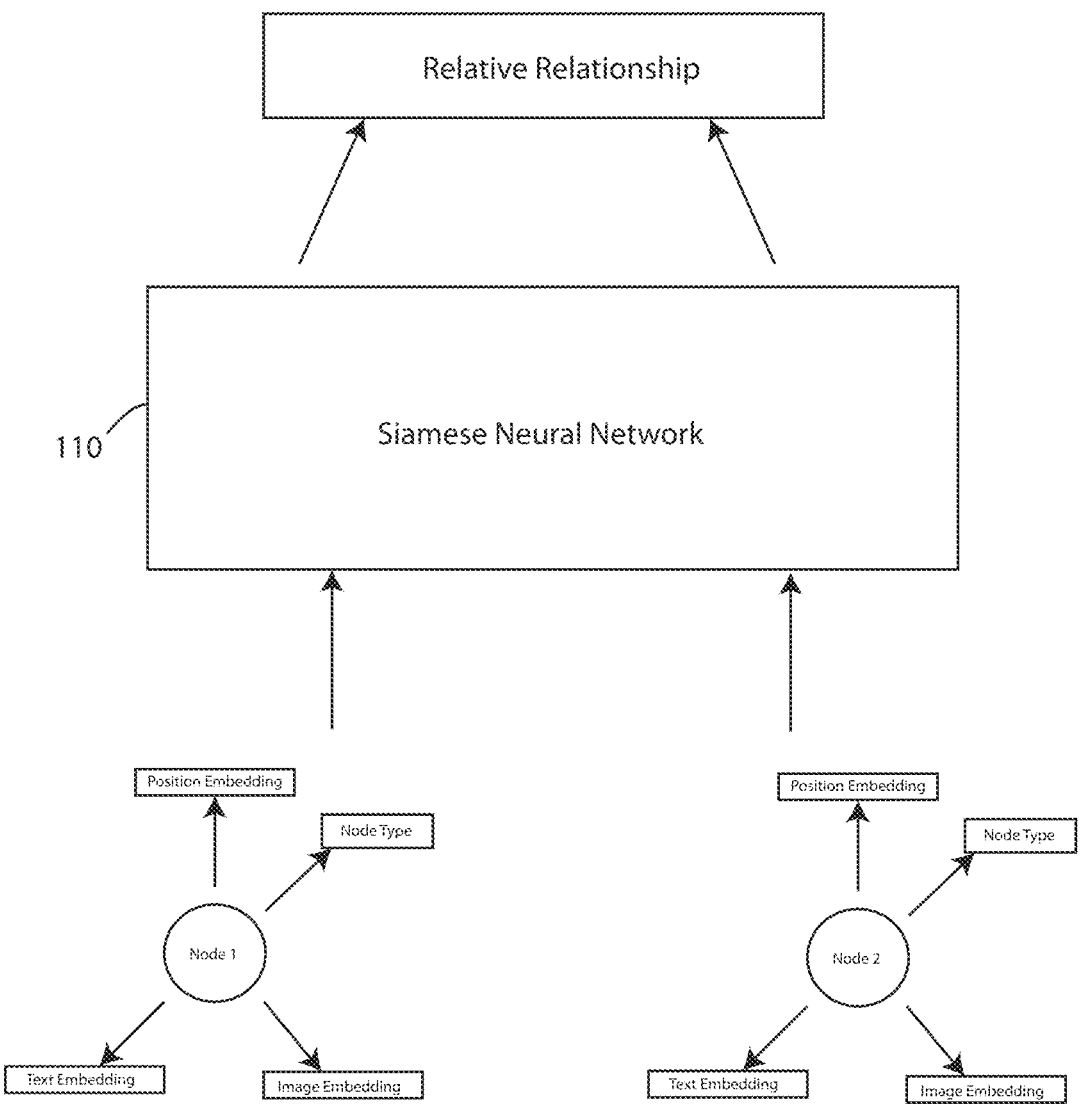
FIG. 7 depicts a block diagram of at least two nodes being input into a neural network to determine the nodes' relative relationship, in accordance with embodiments of the present invention.

Referring back to FIG. 1, the graph module 133 includes one or more components of hardware and/or software program code for inputting at least two nodes into a trained neural network 110 to determine a relative relationship between the at least two nodes. In an exemplary embodiment, all of the nodes are eventually input into the neural network 110. FIG. 7 depicts a block diagram of at least two nodes being input into a neural network to determine the nodes' relative relationship, in accordance with embodiments of the present invention. "Node 1" and its node attributes and "Node 2" and its attributes are input into the neural network 110 to determine the relative relationship between "Node 1" and "Node 2." The relative relationship is the similarity and relationship between the two node, which describes the logical relationship between each text area of the table 111. An example relative relationship output by the neural network 110 is "in the same line," "in the same column," "diagonal from each other," etc.

The neural network 110 can be a Siamese Network comprising two identical networks, Network 1 and Network 2. "Node 1" is fed into Network 1 and "Node 2" is fed into Network 2. Network 1 outputs a vector, Vector 1, and Network 2 outputs a vector, Vector 2. The cosine similarity function of Vector 1 and Vector 2 results in a first output being a number (e.g. 0.8) representing a degree of matching between the "Node 1" and "Node 2." Next, another node (e.g. Node 3) is fed into Network 2. Network 1 outputs a vector, Vector 1, and Network 2 outputs a vector, Vector 2. The cosine similarity function of Vector 1 and Vector 2 results in a second output being a number (e.g. 0.4) representing a degree of matching between Node 1 or Node 2 and Node 3. The numerical output from the neural network 110 are used to build a knowledge graph.

Figure 8:
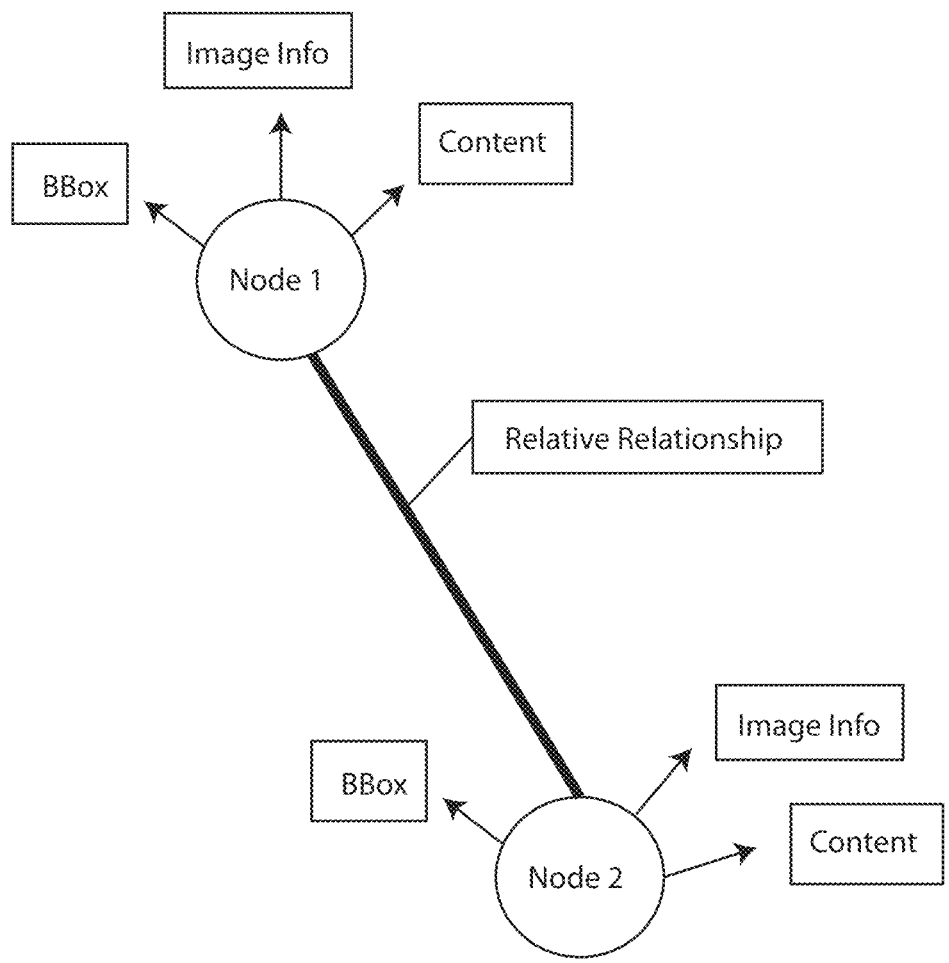
FIG. 8 depicts a partial knowledge graph of at least two nodes using the relative relationship determined by the neural network, in accordance with embodiments of the present invention.

FIG. 8 depicts a partial knowledge graph of at least two nodes using the relative relationship determined by the neural network, in accordance with embodiments of the present invention. The partial knowledge graph depicts "Node 1" and "Node 2" having a relative relationship output by the neural network 110.

The example used herein contains three nodes which are fed into the trained neural network 110. However, there may be less than three or more than three nodes that are fed into the trained neural network 110, each input resulting in an output of the trained neural network, which can be used to build a knowledge graph according to embodiments of the present invention.

The neural network 110 is trained prior to the operation of the table conversion application 130. The neural network 110 is trained by feeding a first input sample and a second input sample into two neural networks to obtain a first vector and a second vector. The first input sample is a sample node type and the second input sample is a sample node type. The first vector and the second vector are mapped into a two-dimensional space. A number between 0 and 1 is calculated using a cosine similarity function of the first vector and the second vector. The number closer to 1 indicates a match between the sample node types, and the number closer to 0 indicates that the sample node types do not match.

In an exemplary embodiment, a semantic matching model of a Siamese network is pre-trained. The matching model enters positive and negative samples of node attributes into the encoder code respectively (e.g. Input1 and Input2), and feeds the two input feeds into two neural networks (Network1 and Network2) that share weights. Each input is mapped to the new space to form a representation of the input in the new space. Through the calculation of Loss, the similarity of the two inputs can be evaluated. The matching node attribute input pairs are positive samples, and the unmatched node attribute input pairs are negative samples. The matching model trained in this way can take the node types/node attributes as the input of the model, and get a score ranging from 0 to 1. The closer the score is to 1, the higher the matching degree between the nodes.

Figure 9:
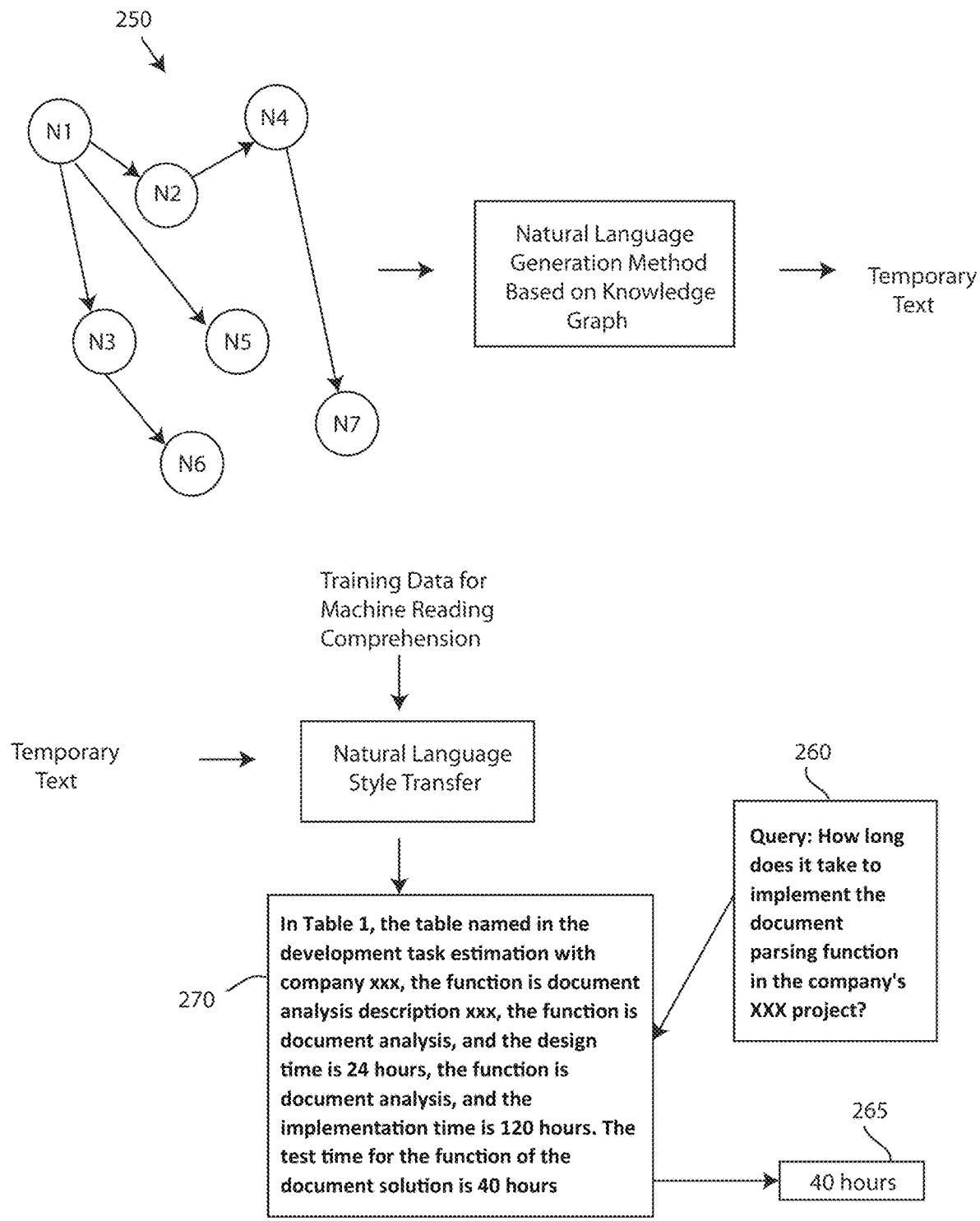
FIG. 9. depicts a knowledge graph and the translation of the knowledge graph into readable text, in accordance with embodiments of the present invention

The graph module 132 builds a knowledge graph using the relative relationship of the at least two nodes. FIG. 9 depicts a knowledge graph and the translation of the knowledge graph into readable text, in accordance with embodiments of the present invention. Nodes "N1-N9" are nodes that represent nine total bounding boxes in table, along with the relative relationship to each other. The knowledge graph is translated by the graph module 132 into machine readable natural language. The translating is performed by using a natural language generation method based on data of the knowledge graph in the graph form to organize a semantic information of each node of the knowledge graph into a continuous natural language temporary text, which is then translated into the machine readable natural language using a natural language style transfer method.

In the illustrated embodiment, the knowledge graph is translated into the following block of text 270, which is the logical combination of the nine nodes representing bounding boxes surrounding the text in table 111:

In Table 1, the table named in the development task estimation with company xxx, the function is document analysis description xxx, the function is document analysis, and the design time is 24 hours, the function is document analysis, and the implementation time is 120 hours. The test time for the function of the document solution is 40 hours.

Thus, if a query 260 is received by the table conversion application 130, the answer 265 can be provided despite the information/text being tabular form originally.

The parsing module 134 of the computing system 120 includes one or more components of hardware and/or software program code for parsing the machine readable natural language 270 in response to a query 260, and outputting a response 265 to the query 260. Continuing with the example, the query 260 is: "How long does it take to implement the document parsing function in the company's XXX project?" The parsing module 134 parses the natural language 270 to deliver the response 265 of "40 hours" to the query 265.

Various tasks and specific functions of the modules of the computing system 120 may be performed by additional modules, or may be combined into other module(s) to reduce the number of modules. Further, an embodiment of the computer or computer system 120 comprises specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry includes proprietary specially designed components (e.g., a specialized integrated circuit, such as for example an Application Specific Integrated Circuit (ASIC), designed for only implementing methods of the present invention).

Furthermore, the table conversion system 100 improves extraction operations of documents with information presented in tabular form by training and leveraging a neural network to build a knowledge graph representing the relative relationship between the text areas of the document in tabular form. The trained neural network infers the correct relationship based on multi-modal distances. The table conversion system 100 is therefore compatible with tables, spreadsheets, etc. of various layouts without the need for building custom table extraction rules for each layout, saving time and computer resources. By training a Siamese Network with the table conversion system 100 and using multi-modal distances from positions on the document, information is accurately and quickly extracted from tabular document for use in QA scenarios. Improved text extraction results in improved extraction efficiency and accuracy.

Figure 10:
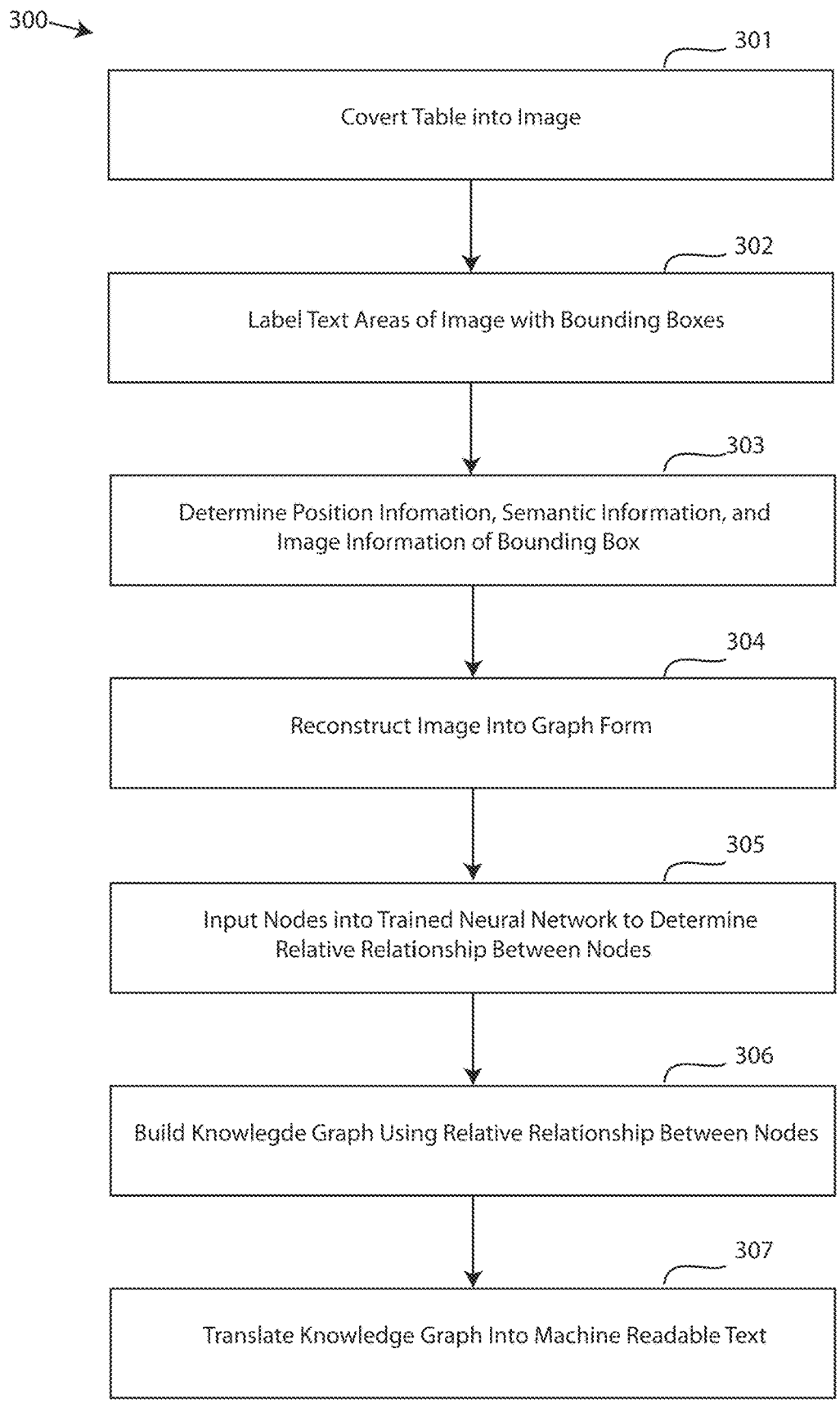
FIG. 10 depicts a flow chart of a method for table conversion, in accordance with embodiments of the present invention.

Referring now to FIG. 10, which depicts a flow chart of a method 300 for table conversion, in accordance with embodiments of the present invention. One embodiment of a method 300 or algorithm that may be implemented for table conversion with the table conversion system 100 described in FIGS. 1-9 using one or more computer systems as defined generically in FIG. 11 below, and more specifically by the specific embodiments of FIG. 1.

Embodiments of the method 300 for table conversion, in accordance with embodiments of the present invention, may begin at step 301 wherein step 301 converts a table into an image. Step 302 labels text areas of the image with bounding boxes. Step 303 determines position information, semantic information, and image information of the bounding box. Step 304 reconstructs the image into graph form. Step 305 inputs nodes into a trained neural network to determine relative relationship between nodes. Step 306 builds a knowledge graph using relative relationship between nodes. Step 307 translates the knowledge graph into machine readable text, which can be parsed by machine reading comprehension models for delivering responses to queries based on tabular document.

Figure 11:
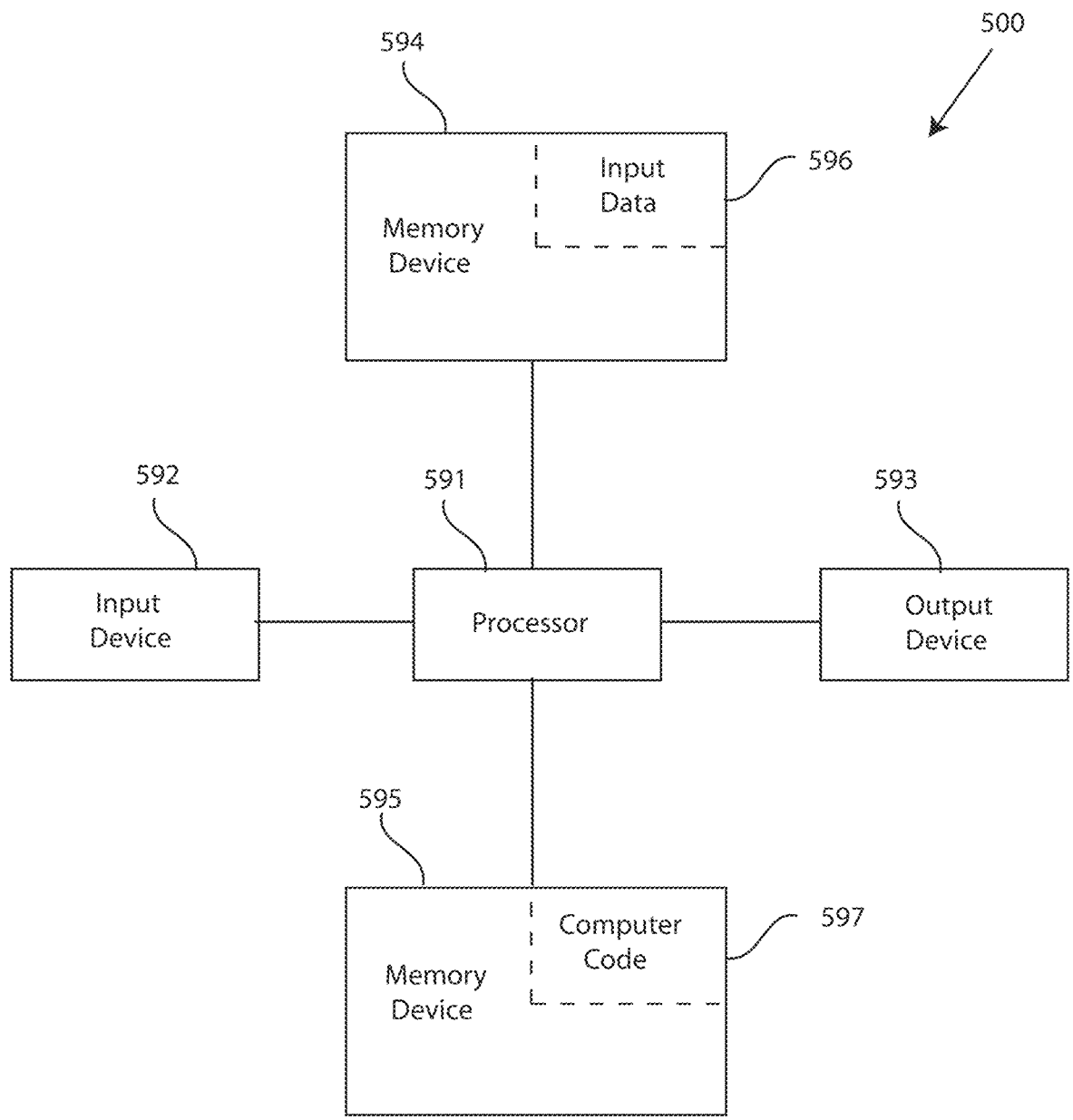
FIG. 11 depicts a block diagram of a computer system for table conversion of FIGS. 1-9, capable of implementing a method for table conversion of FIG. 10, in accordance with embodiments of the present invention.

FIG. 11 depicts a block diagram of a computer system for the table conversion system 100 of FIGS. 1-9, capable of implementing methods for table conversion of FIG. 10, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for table conversion in the manner prescribed using the table conversion system 100 of FIGS. 1-9, wherein the instructions of the computer code 597 may be executed by processor 591 via memory device 595. The computer code 597 may include software or program instructions that may implement one or more algorithms for implementing the method for table conversion, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 11.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to table conversion. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to extract information from tables. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for table conversion. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for table conversion.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 12:
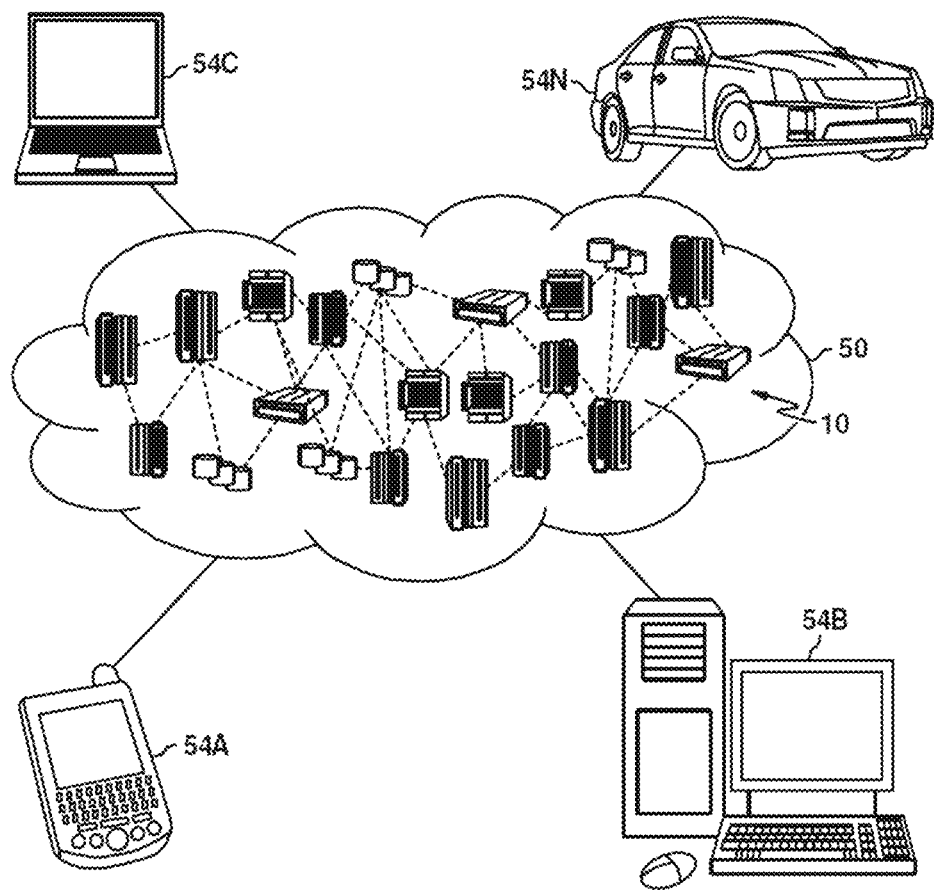
FIG. 12 depicts a cloud computing environment, in accordance with embodiments of the present invention.

Referring now to FIG. 12, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 15 are intended to be illustrative only and that computing nodes 10 and cloud computing environment 50 can communicate with any type of computerized device over any type of network and/or network addressable connection (e.g., using a web browser).

Figure 13:
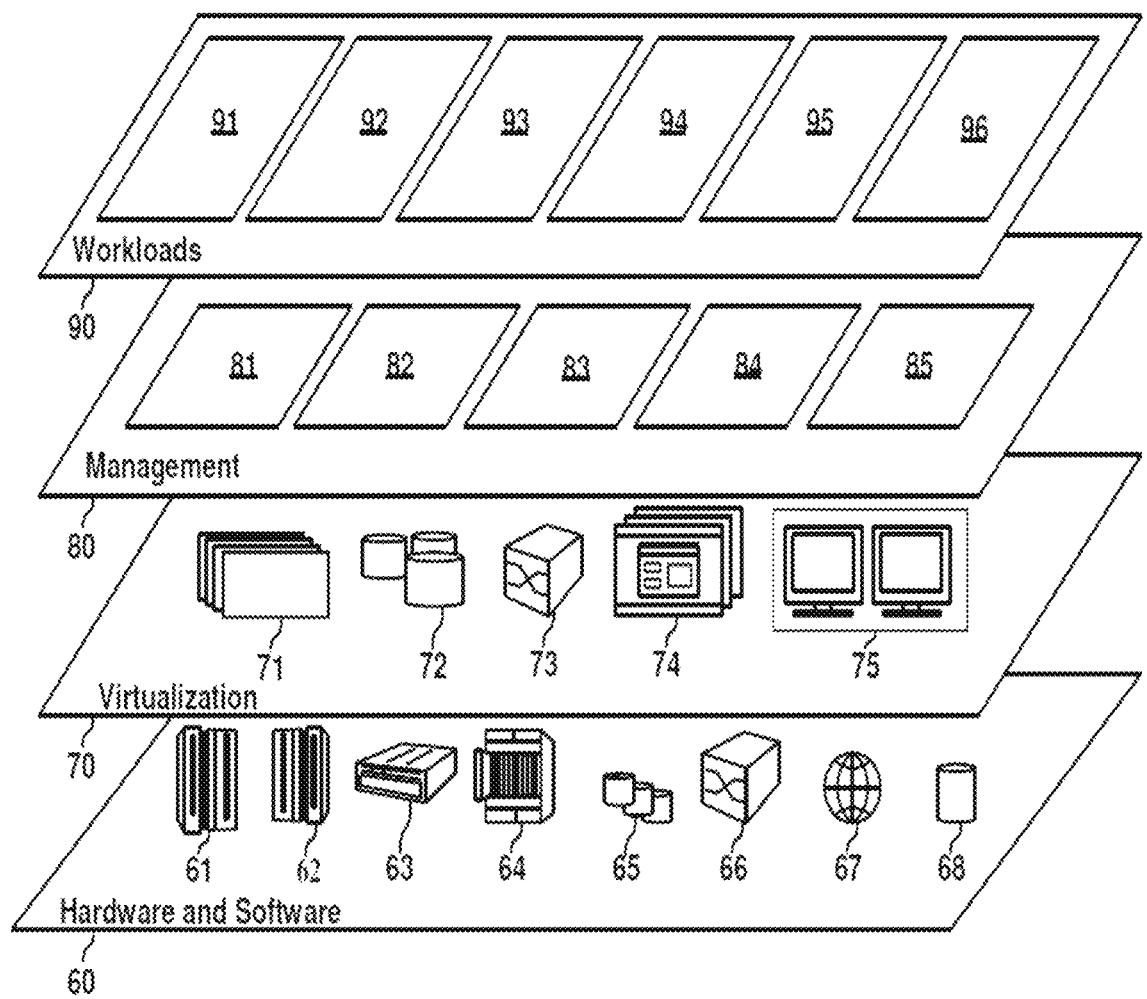
FIG. 13 depicts abstraction model layers, in accordance with embodiments of the present invention.

Referring now to FIG. 13 a set of functional abstraction layers provided by cloud computing environment 50 (see FIG. 12) are shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and table conversion 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
converting, by a processor of a computing system, a table containing text in tabular form to an image;
labeling, by the processor, each text area of the image with a bounding box;
determining, by the processor, for each bounding box, a position information, a semantic information, and an image information;
reconstructing, by the processor, the image into a graph form having a plurality of nodes, wherein each node represents the bounding box of the text areas of the image;
inputting, by the processor, the position information into a first trained neural network for position embedding, the semantic information into a second trained neural network for text embedding, and the image information into a third trained neural network for image embedding;
inputting, by the processor, at least two nodes into a trained neural network to determine a relative relationship between the at least two nodes;
building, by the processor, a knowledge graph using the relative relationship of the at least two nodes; and
translating, by the processor, the knowledge graph into machine readable natural language.

2. The method of claim 1, further comprising classifying, by the processor, the plurality of nodes into a node type.

3. The method of claim 2, wherein the node type includes: a content node, a row name node, and a column name node.

4. The method of claim 1, wherein the translating is performed by using a natural language generation method based on data of the knowledge graph in the graph form to organize a semantic information of each node of the knowledge graph into a continuous natural language temporary text, which is then translated into the machine readable natural language using a natural language style transfer method.

5. The method of claim 1,
wherein the position embedding, the text embedding, and the image embedding are matrix structures with a same shape.

6. The method of claim 1, further comprising:
in response to the converting, performing, by the processor, an optical character recognition of the image to extract a text contained within the image.

7. The method of claim 1, further comprising:
parsing, by the processor, the machine readable natural language in response to a query; and
outputting, by the processor, a response to the query.

8. A computing system, comprising:
a processor;
a memory device coupled to the processor; and
a computer readable storage device coupled to the processor, wherein the storage device contains program code executable by the processor via the memory device to implement a method comprising:
converting, by the processor, a table containing text in tabular form to an image;
labeling, by the processor, each text area of the image with a bounding box;
determining, by the processor, for each bounding box, a position information, a semantic information, and an image information;

reconstructing, by the processor, the image into a graph form having a plurality of nodes, wherein each node represents the bounding box of the text areas of the image;

inputting, by the processor, the position information into a first trained neural network for position embedding, the semantic information into a second trained neural network for text embedding, and the image information into a third trained neural network for image embedding;

inputting, by the processor, at least two nodes into a trained neural network to determine a relative relationship between the at least two nodes;

building, by the processor, a knowledge graph using the relative relationship of the at least two nodes; and translating, by the processor, the knowledge graph into machine readable natural language.

9. The computer system of claim 8, further comprising classifying, by the processor, the plurality of nodes into a node type.

10. The computer system of claim 9, wherein the node type includes: a content node, a row name node, and a column name node.

11. The computer system of claim 8, wherein the translating is performed by using a natural language generation method based on data of the knowledge graph in the graph form to organize a semantic information of each node of the knowledge graph into a continuous natural language temporary text, which is then translated into the machine readable natural language using a natural language style transfer method.

12. The computer system of claim 8,
wherein the position embedding, the text embedding, and the image embedding are matrix structures with a same shape.

13. The computer system of claim 8, further comprising:
in response to the converting, performing, by the processor, an optical character recognition of the image to extract a text contained within the image.

14. The computer system of claim 8, further comprising:
parsing, by the processor, the machine readable natural language in response to a query; and
outputting, by the processor, a response to the query.

15. A computer program product, comprising a computer readable hardware storage device storing a computer readable program code, the computer readable program code comprising an algorithm that when executed by a computer processor of a computing system implements a method comprising:
converting, by the processor, a table containing text in tabular form to an image;
labeling, by the processor, each text area of the image with a bounding box;
determining, by the processor, for each bounding box, a position information, a semantic information, and an image information;
reconstructing, by the processor, the image into a graph form having a plurality of nodes, wherein each node represents the bounding box of the text areas of the image;
inputting, by the processor, the position information into a first trained neural network for position embedding, the semantic information into a second trained neural network for text embedding, and the image information into a third trained neural network for image embedding;
inputting, by the processor, at least two nodes into a trained neural network to determine a relative relationship between the at least two nodes;
building, by the processor, a knowledge graph using the relative relationship of the at least two nodes; and
translating, by the processor, the knowledge graph into machine readable natural language.

16. The computer program product of claim 15, further comprising classifying, by the processor, the plurality of nodes into a node type.

17. The computer program product of claim 16, wherein the node type includes: a content node, a row name node, and a column name node.

18. The computer program product of claim 15, wherein the translating is performed by using a natural language generation method based on data of the knowledge graph in the graph form to organize a semantic information of each node of the knowledge graph into a continuous natural language temporary text, which is then translated into the machine readable natural language using a natural language style transfer method.

19. The computer program product of claim 15, further comprising:
wherein the position embedding, the text embedding, and the image embedding are matrix structures with a same shape.

20. The computer program product of claim 15, further comprising:
in response to the converting, performing, by the processor, an optical character recognition of the image to extract a text contained within the image;
parsing, by the processor, the machine readable natural language in response to a query; and
outputting, by the processor, a response to the query.

* * * * *